Sept. 6, 1927.

R. L. WALLACE 1,641,360

MEANS TO PREVENT REVERSE ROTATION OF A ROTARY MEMBER

Filed Feb. 25, 1926

Inventor
Robert Lee Wallace.
By Lyon & Lyon
Attorneys

Patented Sept. 6, 1927.

1,641,360

UNITED STATES PATENT OFFICE.

ROBERT LEE WALLACE, OF LOS ANGELES, CALIFORNIA.

MEANS TO PREVENT REVERSE ROTATION OF A ROTARY MEMBER.

Application filed February 25, 1926. Serial No. 90,511.

This invention relates to means to prevent reverse rotation of a rotary member and is useful, for instance, to hold a rotary part of an automobile, as for example the drive shaft, against reverse rotation so that the automobile, if stopped while ascending a grade, will be prevented from rolling backward down the grade.

In a device of this character it is, of course, essential to provide for release of the rotary member from the holding means, when it is desired to put the transmission in reverse to effect backing of the automobile.

This invention is an improvement on the device patented to Horatio G. Coykendall, Nov. 18, 1924, No. 1,516,081. The improvement relates in one respect to the means for releasably holding the dog toward the rotary member that is engaged by said dog.

An important object of the invention is to provide for easy release of the holding means, even though there may be considerable reverse torque of the rotary member as would be caused, for example, in the drive shaft of an automobile, held by such means against backing down a grade. Thus, the holding means may be readily thrown out of commission if it be desired to back the automobile down the grade.

A further object is to make provision for the dog that engages the rotary member to be supported in engagement with the rotary member by a movable member so that, when it is desired to release the dog, the movable member need only be lowered.

The accompanying drawings illustrate the invention:

Figure 1:
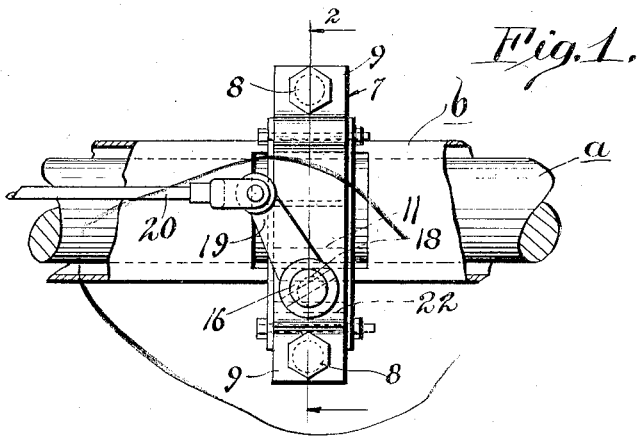
Fig. 1 is a side elevation of a means embodying the invention for preventing the reverse rotation of a rotary member, the rotary member also being shown.
Figure 4:
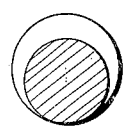
Fig. 4 is an enlarged cross section through the cam shaft cutting through the cam that supports the dog-wedging member.

The rotary member is fragmentarily indicated at $a$ and may be, for example, the propeller shaft of an automobile. If this shaft is enclosed in a housing, as is frequently the case, such housing, indicated at $b$, may serve for the anchorage upon which the invention is mounted. In the instance shown in the drawings, split clamping means comprising hollow sections 6, 7 encloses a portion of the housing $b$, being securely clamped thereon by bolts 8 which pass through ears 9 of the clamp sections.

The clamp section 7 is provided with a chamber 10 in which is movably mounted a dog 11 that engages the rotary member $a$, said dog, in this instance, being in the form of a roller, a type frequently employed in preventing reverse rotation of a rotary member.

A movable member 12 is provided within the chamber 10 to support the dog 11 in engagement with the rotary member $a$, said member being releasable so that, when it is desired that reverse rotation of the rotary member occur, the support for the dog 11 will be lowered to permit the dog to drop.

The member 12 is preferably a wedge-shape block having its wider end pointing downwardly. The outer face of the block 12 preferably bears against the slanting face 13 of the wall of the chamber 10 so that, as the block 12 moves upwardly, said block is wedged toward the rotary member $a$, thus narrowing the space in which the dog 11 is positioned. This tends to force the dog 11 upwardly and at the same time holds it forcibly toward the rotary member, which then is free to rotate in the direction of the arrow in Fig. 3, but which cannot, when the block 12 is raised, turn in a reverse direction.

The wedging effect of the block 12 upon the dog 11 is secured in two ways for, not only is the face 13 aslant upwardly and inwardly, but the inner face 14 of the block 12 is aslant upwardly and outwardly. The face 14 is preferably arcuate, the radius of curvature of said face being struck from the axis of the rotary member when the block 12 is in the lowered or released position shown in Fig. 2. Thus, in the lowered position, the face 14 would be concentric with the rotary member, allowing the dog 11 to loosely lie within the chamber 10 in the arcuate channel between the block 12 and rotary member. When the block 12 is raised, as in Fig. 3, the curved face 14 is no longer concentric with the rotary member $a$, but the lower end of the face 14 is closer to the rotary member than is the upper end of said face, thus holding the dog 11 in elevated position. In its elevated position the dog 11 has a three point bearing as it bears against the rotary member 2, against the upper portion of the face 14, and against an upwardly and inwardly slanting face 15 of the wall of the chamber 10.

Any suitable means may be provided for operating the block 12 from the lowered position into its elevated position and such means comprises, in this instance, a cam shaft 16 inserted in a bearing 17 in the clamp member 7, said bearing extending across the lower portion of the chamber 10. The shaft 16 is provided with a cam 18 on that portion of the shaft that extends across the lower portion of the chamber 10 so that, when the shaft 16 is turned to the position shown in Fig. 3, the higher point of the cam will bear against the lower end of the block 12 and hold said block in elevated position to prevent reverse rotation of the rotary member $a$. When the shaft 16 is turned to the position shown in Fig. 2, the low point of the cam is adjacent to the block 12 and, accordingly, gravity causes said block to descend to its lowered position. The cam 18, in this instance, is merely an eccentric, and the shaft 16 is turned by an arm 19 which in turn is operated by a rod 20 that may extend to within reach of the operator. If the invention is used in connection with an automobile, the rod 20 will extend to a point adjacent the seat of the driver of the automobile so that when he desires to back the automobile, he will be enabled from the seat to release the dog 11 at the time that he puts the transmission gear in reverse, or the rod 20 may connect with the variable speed and direction controlling mechanism of the automobile, as disclosed in the hereinbefore mentioned patent, so that the dog will be thrown into inoperative position on the movement of said variable speed and direction controlling mechanism into reverse position.

In this instance, to prevent bending of the rotary member $a$, since it is a shaft, the clamp member 6 is provided in its interior with a bushing 21 positioned opposite to the chamber 10 so that, when the dog 11 is wedged toward the rotary member, the bushing 21 will prevent the shaft from being deflected.

Figure 3:
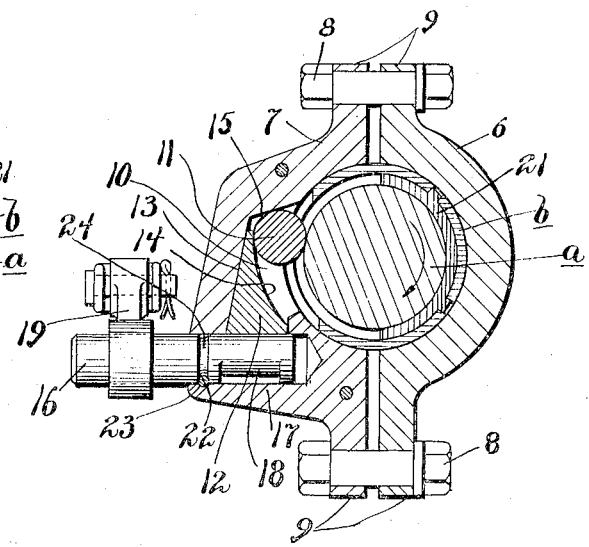
Fig. 3 is a sectional elevation similar to Fig. 2 with the operating parts in position to hold the dog toward the rotary member.

From the foregoing, it will be seen that, in operation, assuming that the parts are in the position shown in Fig. 3, the rotary member $a$ can only turn in the direction indicated by the arrow, and that any tendency to turn said member in the reverse direction will be resisted by the wedging of the roller 11 in the space between the block 12 and rotary member, said space gradually narrowing downwardly when the block is in the raised position.

Figure 2:
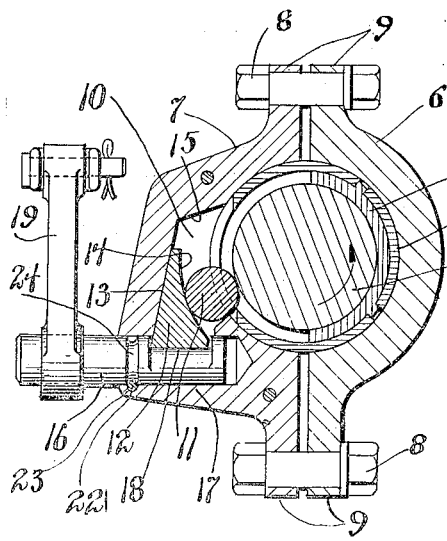
Fig. 2 is an enlarged sectional elevation on the line indicated by 2—2, Fig. 1, the operating parts being in position for releasing the dog.

When it is desired to permit reverse rotation of the rotary member $a$, as indicated by the arrow in Fig. 2, the operator will move the rod 20 to position the cam 18 as in Fig. 2, thus bringing the curved face 14 concentric with the rotary member so as to relieve the wedging effect upon the dog 11 and permit said dog to drop.

The cam shaft 16 may be held in place by a spring ring 22 which seats in a groove 23 in the bearing 17 and in an annular groove 24 in the shaft 16.

I claim:

1. A means of the character described, comprising a chambered member, a dog in the chamber, and manually operated means cooperating with a wall of the chamber to force the dog upwardly and inwardly into engagement with a rotary member adjacent to the chamber to prevent rotation of said member in one direction, the dog being self-retracting when said means are retracted.

2. A means of the character described, comprising a chambered member, a dog in the chamber, and manually operated means to wedge the dog upwardly and inwardly into engagement with a rotary member adjacent to the chamber to prevent rotation of said member in one direction, the dog being self-retracting when said means are retracted.

3. A means of the character described, comprising a chambered member, a dog in the chamber, a block in the chamber to engage the dog, and manually operated means to raise the block, the chamber wall having a face cooperating with the outer face of the block to wedge the block inwardly as it moves upwardly into engagement with a rotary member adjacent to the chamber to prevent rotation of said member in one direction, the dog being self-retracting when said means are retracted.

4. A means of the character described, comprising a chambered member, a dog in the chamber, a wedge-shape block in the chamber to engage the dog, the block having its wider portion pointing downwardly, and means to raise the block to wedge the dog inwardly into engagement with a rotary member adjacent to the chamber to prevent rotation of said member in one direction.

5. A means of the character described, comprising a chambered member, the chamber being narrowed upwardly, a dog in the chamber, a movable support in the chamber, and manually operated means to raise the support to move the dog upwardly, the dog being self-retracting when said means are retracted.

6. The combination with a rotary member, of a block having an arcuate face, the radius of curvature of said face being struck from the axis of the rotary member and said face being concentric with the rotary member when the block is in one position, means to move the block into a position eccentric to the rotary member, and a dog between the block and the rotary member.

7. A means of the character described, comprising a chambered member, a dog in the chamber, and manually operated means cooperating with a wall of the chamber to force the dog inwardly toward the axis of a rotary member adjacent to the chamber and in a direction corresponding to one direction of rotation of the rotary member, the dog being self-retracting when said means are retracted.

Signed at Los Angeles, California, this 18 day of February, 1926.

ROBERT LEE WALLACE.